May 17, 1966     O. E. MILLER ETAL     3,251,764
APPARATUS FOR TREATING IONIC LIQUIDS
Filed Nov. 1, 1961     2 Sheets-Sheet 1

INVENTORS
Omer E. Miller
Frank J. Wolf
BY Bacon & Thomas
ATTORNEYS

INVENTORS
Omer E. Miller
Frank J. Wolf
BY Bacon & Thomas
ATTORNEYS

3,251,764
APPARATUS FOR TREATING IONIC LIQUIDS
Omer E. Miller, South Plainfield, and Frank J. Wolf, Westfield, N.J., assignors to Deinall Corporation, Westfield, N.J., a corporation of New Jersey
Filed Nov. 1, 1961, Ser. No. 149,374
18 Claims. (Cl. 204—301)

This invention relates to an improved method for deionization, demineralization or ion-concentration of water or other ionic liquids and to an improved electrodialysis cell for such use. More particularly, the invention relates to the utilization of a novel arrangement of ion exchange resins between ion-permeable membranes which makes possible a substantial enhancement of ion-removing capacity and a substantial decrease in electrical power consumption.

The primary object of the invention, therefore, is to provide a more highly efficient and effective method and apparatus for deionizing, demineralizing or concentrating ionic liquids than is presently available.

Another object of the invention is to provide a simple and economical method and apparatus for the production of high quality water.

Another object of the invention is to provide an improved method and apparatus for reducing the ion content of ionic fluids whereby uniformity of performance over a prolonged period of time is assured.

Various approaches to deionization by electrodialysis have been disclosed, with the most effective previous results being obtained using a mixed bed of anion exchange resin and cation exchange resin between ion-permeable membranes, and passing a direct electrical current through said membranes and bed. It has now been discovered, however, that markedly superior results are obtained by providing subdividing means in the space between the ion-permeable membranes, so that anion and cation exchange resins are arranged in alternating and interfitting segments with each type of resin contacting an ion-permeable membrane in such a way that the entire membrane or barrier is useful for the transport of similarly charged ions. The subdividing means, which is arranged transversely of the flow of water being treated, should be of a porous nature, capable of confining the particled ion exchange resins while permitting free passage of liquid therethrough, from one segment to the next, and is suitably fashioned from plastic cloth or screening.

The subdividing means, in a preferred embodiment, provide essentially wedge-shaped (in cross-section) chambers with the base of each chamber falling along one ion-permeable membrane, and the apex thereof extending almost to, but slightly short of the opposed ion-permeable membrane. It will be understood, however, that subdividing means providing chambers of other configuration may be employed without departing from the general principle of the invention, providing each chamber has a substantial contact area along one of said permeable membranes, with adjacent chambers being in contact with a different one of the membranes and extending toward but terminating short of a respective opposed membrane.

In its method aspects, the invention comprises the treatment of water or other ionic liquid to reduce its ion content by passing such liquid sequentially through a plurality of alternately disposed beds of anion and cation exchange materials contained between a pair of ion-permeable membranes, bounded by electrode compartments containing an anode and a cathode, respectively, the anion exchange beds contacting only that ion-permeable membrane nearest the anode compartment and the cation exchange beds contacting only that ion-permeable membrane nearest the cathode compartment, and simultaneously passing a direct current between the anode and cathode through the membranes and the anion and cation exchange beds.

It will thus be understood that as water or other ionic liquid to be treated advances progressively through the several interfitting segments, the ions removed in each segment migrate, under the force of the applied electrical current from the apex near one membrane toward the base of each chamber and through the ion-permeable membrane with which it is in contact. The ions passing through the membranes are removed by passing rinse liquid along the outer faces of the membranes, concentration of ions in the rinse liquid thereby being effected. The apparatus, if desired, may be used for ion-concentration purposes by passing the liquid to be concentrated through the electrode chambers. Desirably, in water deionization, the rinse liquid from the anode compartment is used in the cathode compartment. The rinse liquid may be passed along the outer faces of the membranes in a generally countercurrent direction of flow with respect to the direction of flow through the treating chamber.

The subdividing means separating the several segments or chambers can be of unitary or built-up rigid structure, or what might be termed, a flexible structure with a flexible subdivider laced in zigzag fashion around staggered rows of guides or spacers adjacent the ion-permeable membranes. While many types of material can be employed in the subdividing means, plastic screening has been found quite satisfactory.

The novelty in the improved electrodialysis cell also resides, in part, in providing means, as more fully hereinafter described, for effectively supporting electrodes in close proximity to outer faces of the ion-permeable membranes while minimizing the volume of the electrolyte chambers, and further in providing means for circulating rinse water successively through anode compartment and cathode compartment to reduce sludging in the cathode compartment.

As with other electrodialysis systems, the apparatus can be employed as a single cell, with an electrode adjacent the outer surface of the ion-permeable membranes, or as a multiple cell unit having a plurality of cells separated by electrolyte chambers and with the two outermost cells carrying an anode chamber and a cathode chamber respectively.

Other features and advantages of the improved cell structure of the present invention include the following:

(a) The entire surface of each membrane is utilized for ion transport since it is in contact with only one type of resin.

(b) The arrangement of resins, once established, is maintained during operation of the cell, as the flow of water does not cause the resins to be shifted due to differences in density or size.

(c) The deionization (ion exchange) effect is more efficient since there is substantially no channeling of fluids through the apparatus, even at relatively low flow rates.

(d) The structure makes possible the use of different kinds of resins within the same cell. For example, in the first stages of the cell (in the first few anion resin chambers), an anion resin having a weaker base strength but higher binding capacity can be used, while the later stages can contain a strong base resin for the removal of weaker acids. In a similar way, the total ion binding power of each stage can be varied and predetermined by using resins of suitable charge density and/or particle size, thus providing for maximum and uniform utilization of the membrane surface.

(e) The ion exchange material can be readily packed in the cell segments to form relatively stable beds of desired density. The density of packing of the beds can be easily adjusted to ensure optimum cell performance.

(f) The cell segments can be individually charged, cleaned, and recharged without disassembly of the cell.

(g) The relative amounts of anion exchange resin and cation exchange resin need not be equal, but can be varied by altering the contour of the subdividing means. Thus, for example, a series of segments or chambers receiving one type of resin can have a convex or expanded wedge-shaped contour interfitting with a series of compartments for the other type resin having a concave or contracted wedge-shaped contour.

(h) Because each membrane is contacted only by anion exchange resin, or by cation exchange resin, various types of ion-permeable membranes can be employed, although it is preferable to employ permselective membranes.

This invention will be more readily understood from a consideration of the accompanying drawing in which the various parts of the apparatus are identified by suitable reference characters in the several views and in which.

Figure 1:
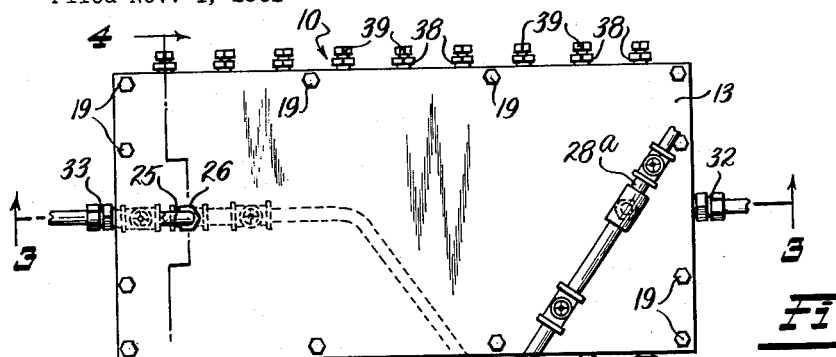
FIG. 1 is an exterior plan view of a preferred form of deionizing apparatus in accordance with the present invention.
Figure 2:
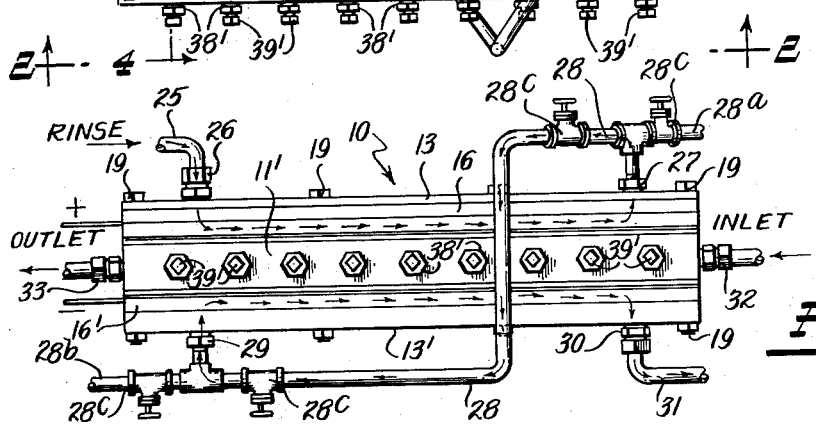
FIG. 2 is a side elevation taken in the direction of the arrows 2—2 as shown in FIG. 1.
Figure 3:
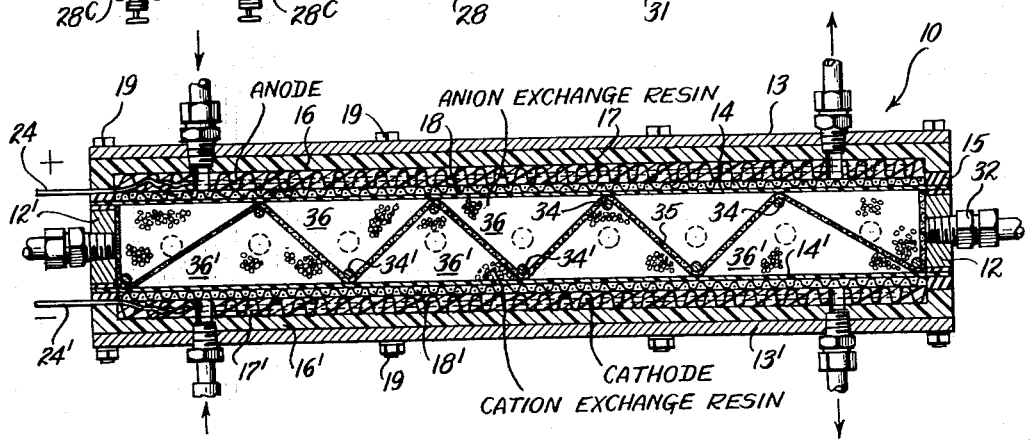
FIG. 3 is an enlarged vertical cross-section substantially along the lines 3—3 as seen in FIG. 1.

As shown in FIGS. 1 to 4 and 6 of the drawing, a deionization cell 10 is made up of a central core, in the form of a rectangular frame providing side walls 11, 11' and end walls 12, 12', and outer cover plates 13, 13' having a peripheral contour conforming to that of said central core. Interposed between the central core and the cover plates are ion-permeable membranes 14, 14', gaskets 15, 15' of electrically insulating material and peripherally ribbed electrode backing members 16, 16', also formed of electrically insulating material. Additional sealing around the periphery of the cell may be obtained between these members by use of a suitable plastic cement of electrically insulating properties. Optionally, the gaskets 15, 15' may be replaced by such cement.

Within and substantially filling the space provided between the membranes 14, 14' and backing members 16, 16' are arranged fluid-permeable spacer and support members 18, 18' in juxtaposition to the membranes, and suitably fashioned from plastic mesh or screening, and electrode assemblies 17, 17'. The several interposed members are held firmly clamped between the cover plates 13, 13' and the central core by a plurality of bolts 19 suitably spaced around the periphery thereof.

Figures 5, 7:
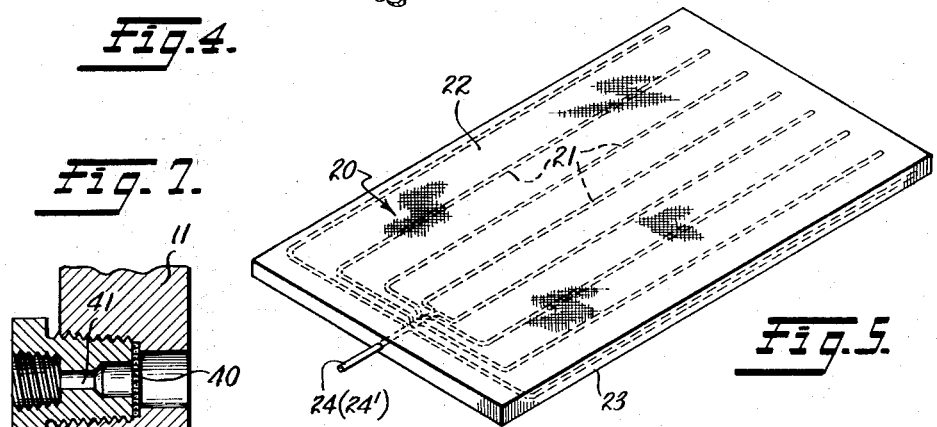
FIG. 5 is an isometric view of an electrode assembly for use in the apparatus.
FIG. 7 is a fragmentary sectional view illustrating a screened plug for use in connection with equipment as shown in FIG. 6.

The electrode assembly as more clearly shown in FIG. 5, comprises a coarse mesh plastic screen 20 with a multiple branched electrode 21 incorporated therein to be substantially uniformly spaced from the upper and lower surfaces 22, 23 of the electrode assemblage, and communicating with a lead 24 or 24' which passes between the gaskets 15, 15' and backing members 16, 16' for coupling with an external power source. In thus supporting the branched electrode within the interstices of a coarse plastic screen, the electrode is held uniformly spaced from the adjacent ion-permeable membrane while at the same time providing intimate contact with rinse water and electrolyte which is circulated through the mesh support and around the electrode.

In the drawing, the plain numbered and prime numbered components 14, 15, 16, 17, 18 and 24 are associated, respectively, with the anode and anode compartment and the cathode and cathode compartment of the cell. While various materials can be used, respectively, in the anode and cathode, it has been found that stainless steel is quite satisfactory for the cathode, but that platinum or platinum-coated wire is preferred for the anode. The ion-permeable membranes 14, 14' can be of nonselective materials such as the woven fabrics of natural or synthetic materials conventionally employed in the art, but are preferably permselective with the membrane 14 being formed of anion exchange material and the membrane 14' being formed of cation exchange material. Illustrative of such membranes are those formed in accordance with the disclosures of U.S. Patent No. 2,681,319 and No. 2,681,320 issued to George W. Bodamer.

For circulation of rinse liquid (or liquid to be concentrated) through the electrode chambers, a plurality of fluid line couplings are associated with the cover plates 13, 13' and backing members 16, 16' so that rinse liquid through a feed line 25 enters the anode compartment at intake coupling 26 and is discharged through outlet coupling 27 through return line 28 leading to inlet coupling 29 of the cathode chamber, the combined electrolyte being discharged through outlet coupling 30 and discharge line 31. The fluid-permeable spacer members 18, 18' serve to disperse the rinse liquid over the surfaces of the membranes so that substantially the entire area is effectively rinsed. It will be noted that the flow of rinse water is countercurrent to the flow of liquid in the treating compartment. The rinse liquid in the anode compartment becomes slightly acidic and is to some extent neutralized during passage through the cathode compartment.

While the preferred manner of operation for water-deionization has been described, it will be understood that separate streams of liquid may be employed in parallel flow through the electrode compartments and that concurrent as well as countercurrent flow through these compartments with respect to the flow through the treating compartment is contemplated. Auxiliary lines 28a and 28b and valves 28c associated with the various flow lines permit flexibility of operation. Thus, line 28a may be used as an anode discharge and line 28b as a cathode inlet.

Flow of liquid to be treated in the middle compartment of the cell is effected by introducing the raw liquid through an inlet coupling 32 in end wall 12 and discharging treated liquid through an outlet coupling 33 in end wall 12'.

Extending between side walls 11, 11' of the central core are a plurality of spaced rods or guides 34 adjacent the membrane 14, and a plurality of similarly spaced rods or guides 34' adjacent the membrane 14', the latter rods 34' being in uniformly staggered relationship to the rods or guides 34. A fine mesh plastic screen 35 is laced in zig-zag fashion around the rods or guides 34, 34' and anchored in a taut position, thereby dividing the space between the membranes 14, 14' into a plurality of wedge-shaped chambers 36 having the bases thereof along the membrane 14, and a plurality of wedge-shaped chambers 36' having the bases thereof along the membrane 14'.

The several chambers 36 are filled with particled anion exchange resin, and the several chambers 36' are filled with particled cation exchange resin. Thus, when liquid to be treated passes through the cell, it must necessarily be brought into repeated alternate contact with bodies of anion exchange resin and cation exchange resin. The liquid upon entering the cell is dispersed at the inlet throughout the width of the cell and advances as a body through the staggered beds of exchange resin.

The ion exchange materials within the alternately disposed beds are preferably in the form of discrete particles known to the art as resin beads. These beads are of synthetic organic polymeric anion and cation exchange resins, respectively. As previously mentioned, all of the anion exchange material may be of the same type and all of the cation exchange material may be of the same type. Alternatively, different anion exchange chambers may be packed with anion exchange material of different binding strength and, likewise, cation exchange material of different binding characteristics can be packed in the different cation exchange chambers. The resin beads are packed within the respective chambers with sufficient pressure to ensure substantial contact with each other and with the ion exchange membranes and dividing walls and so that shifting of the beads within the beds is virtually eliminated. The degree of packing pressure, however, should not be sufficient to cause distortion of the chamber walls or retard the passage of liquid through the beds. The chamber may be pre-filled with resin beads during assembly of the structure, or may be filled after cell structure assembly by means hereinafter described.

In alignment with each of the resin chambers 36, 36', the side walls 11, 11' of the central core are provided with apertured adaptors 38, 38' providing access to the interior of the resin chambers for filling and removing resin from the same, for cleaning the resin from time to time, and/or for adjusting resin packing pressure. Normally, these adaptors are closed by means of removable plugs 39, 39'. As best seen in FIG. 7, the adaptors 38, 38' are provided with a screen 40 across their inner ends with a central orifice 41.

For simple washing of resin within chambers 36 or 36', the plugs 39, 39' of opposed adaptors may be removed, a hose attached in place of the plug in one adaptor and water flushed through the ion exchange bed and out the open adaptor on the other side. The screen 40 serves to prevent escape of the resin from the chamber while permitting free circulation and discharge of wash water, and the like. The use of the screened adaptor also facilitates the hydraulic charging of resin to the chamber, since resin particles, suspended in a carrier fluid can be introduced through a feed line attached in place of an adaptor on one side of the cell, the particles being retained within the chamber while the carrier fluid is discharged through the opposed screened adaptor. The amount of hydraulic packing pressure can be varied by using adaptors with orifice 41 of selected diameter.

Figure 6:
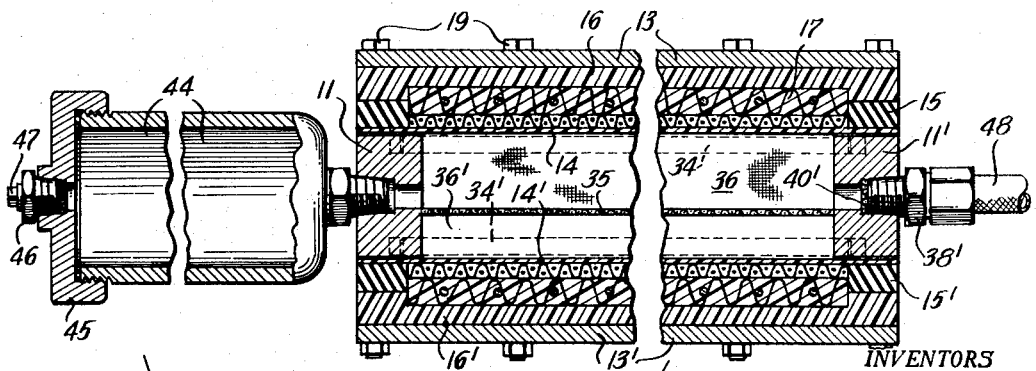
FIG. 6 is a view similar to FIG. 4 showing associated equipment for charging, discharging, and cleaning resins employed in the apparatus.

For more thorough cleaning or treatment of resin from the individual compartments 36 or 36', it sometimes is desirable to attach in place of an adaptor 38', a suitable vessel or expansion chamber 44, as shown in FIG. 6 of the drawing, preferably having a large removable cap 45 and a removable screened adaptor 46 and plug 47, which are similar in size to the screened adaptor 38 and plugs 39. The use of such an expansion chamber 44 is particularly desirable in periodic cleaning of the resin chambers at the inlet end of the cell, since, even with preliminary filtration, it is possible for foreign particles to collect in the resin chambers. The resin in the selected chamber 36 or 36', may be forced into the chamber 44 by water from a hose 48 attached to adaptor 38' in place of plug 39' as shown in FIG. 6. After the treatment which may be desired in the expansion chamber 44, the resin can be hydraulically returned to chamber 36 by connecting the hose 48 at the location of the plug 47 of adaptor 46.

In like manner, the expansion chamber 44 can be employed as a filling and storage chamber for a quantity of resin, and by providing a number of such chambers containing resins, it will be apparent that charging or recharging of the apparatus to adapt it to differing conditions is facilitated.

Figure 8:
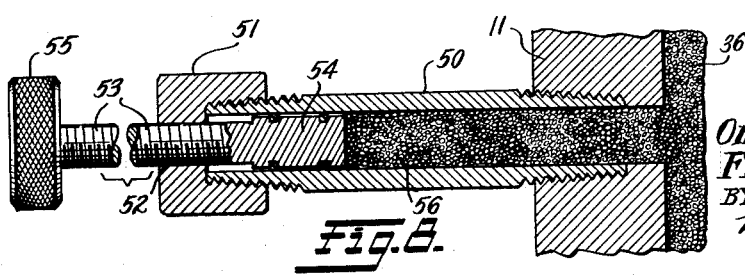
FIG. 8 is a fragmentary sectional view showing auxiliary means for regulating the packing pressure of an ion exchange bed of the apparatus.
Figure 4:
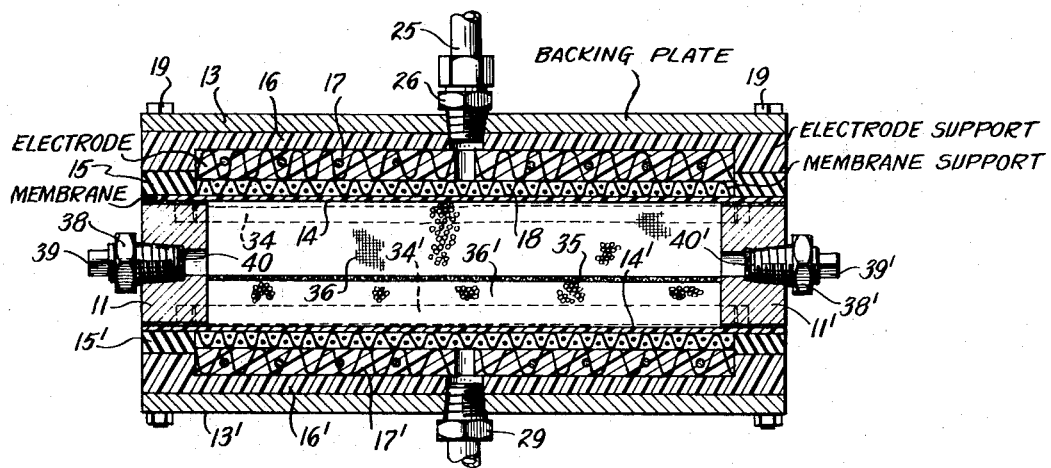
FIG. 4 is a still further enlarged vertical cross-section substantially along the lines 4—4 as seen in FIG. 1.

An optional means for maintaining and adjusting resin packing pressure is illustrated in FIG. 8. This comprises a storage sleeve 50 threaded at each end and adapted to replace an adaptor 38 as shown. A cover 51 closes the outer end of the sleeve 50 and is provided with a threaded central aperture 52 engaging the threaded shank 53 of a plunger 54 disposed for selective positioning within sleeve 50. A knurled knob 55 permits the plunger shank 53 and plunger 54 to be rotated until the latter is adjusted to apply a selected pressure against resin beads 56 in the sleeve 50, these beads in turn being forced into the cell chamber. The plunger can be retracted to take care of resin expansion within the cell chamber or advanced to take care of resin contraction. It will be understood that such pressure-adjusting means is not essential but may be provided where very exact control of resin pressures at all times is deemed desirable.

It will be recognized that with the support for the membranes, the relatively tightly packed resin beds and the spacing and positioning of the electrodes which is provided, coupled with the fact that the flow of water being treated and flow of rinse through the electrode compartments may be under pressure, the cell can function properly in any attitude or orientation, with or without the aid or influence of gravity.

The selection of particular anion exchange resins and cation exchange resins to employ in the apparatus will depend in part on the amount and nature of ionic material in the water or other liquid to be treated, and in part on the degree of deionization or dimineralization called for in the treated liquid. Thus, the apparatus can be employed for purposes as diverse as converting brackish water to potable water or producing essentially ion-free water as a substitute for distilled water.

The bodies of ion exchange resins represent a reserve capacity in the operation of the cell which can either be increased by the passage of excess electrical energy through the cell, or decreased by the passage of excess ionic material through the cell. Following any change in operating conditions, i.e., type of resin, electrical current, or flow of ionic material, the cell will require a period of several hours to acquire a "steady state" condition. After reaching such "steady state" condition, the cell operates for long periods of time with a high degree of uniformity, and the most meaningful performance data is obtained when the cell is operating at a "steady state" condition.

In order that the advantages of the new cell construction can be clearly visualized, there is presented herewith an example showing comparative operation of the new cell, with segmented resin chambers and a cell, identical in size and containing the same types of resins but wherein the resins are arranged in random mixture between the membranes.

EXAMPLE

Having reference to the drawing, two cells were employed each having a core 11 providing a resin chamber approximately 6" wide, 12" long and ½" thick, with opposed faces covered with an anion-permeable membrane and a cation-permeable membrane respectively. Both were equipped with similar carbon electrodes (platinum preferred for more extended operation) covering the same area of approximately 6" x 12".

In one cell, hereinafter referred to as the "Segmented Bed Cell," rods 34, 34' were placed at ½" intervals in a staggered arrangement such as shown in the drawing, and plastic screening was woven around them in rigzag fashion to form a plurality of wedge-shaped resin chambers. The chambers 36' adjacent the cation-permeable membrane were filled with a cation exchange resin of the sulfonic acid type (IONAC C-240) and the chambers 36 adjacent the anion-permeable membrane were filled with a strongly basic anion-exchange resin (A-540).

In the other cell, hereinafter referred to as the "Mixed Bed Cell," anion exchange resin and cation exchange resin of the same types and from the same manufacturer's lots as used in the Segmented Cell were uniformly mixed and placed between the membranes. The volume of resin used in the Mixed Bed Cell was a little greater (about 10%) than that of the Segmented Cell, since the interior of the latter was partially occupied by the rods and screening.

The cells were operated using municipal water supply (Westfield, New Jersey—partially softened by conventional sodium exchange). For rinsing, water from the feed stream was flowed through the anode compartment, then through the cathode compartment, and then discharged. Flow conductivity cells were placed in the water stream entering the cell and in the exit streams. During operation the flow of water was controlled by a pressure-regulating valve followed by calibrated orifices. Direct current electric power was obtained by full wave rectification of the output of a variable autotransformer. Dissolved solids as derived from conductivity were recorded in all instances as p.p.m. of NaCl.

Measurements made during operation of the cells were:

(1) Time of operation—elapsed time meter.
(2) Conductivity of feed solution—periodic check.
(3) Conductivity of rinse solution or waste stream—periodic check.
(4) Conductivity of treated stream—continuous (pen and ink) recording and periodic check.
(5) Rates of flow of treated and rinse streams—periodic check.
(6) Current demand—periodic check.
(7) Voltage—periodic check.

In the operation of the cells, flow rates and voltage were varied from time to time. In the following tables pertinent performance data under various operating conditions for the two cells are presented, all values representing "steady state" conditions after the adjustment of the voltage and/or flow rate to the stated amount.

mented bed cell" is capable of producing higher quality water at higher current efficiency than the "mixed bed cell."

As a further means for the practical comparison of performance, the foregoing data are converted to efficiency, design, and performance factors, which are defined as follows:

(a) The efficiency factor is the product of percentage deionization and percentage current efficiency. Thus, if a cell removed 100% of all ions entering with a current efficiency of 100%, its efficiency factor would be 1 (or $100 \times 10^{-2}$).

(b) The design factor, which reflects the amount of deionization which can be carried out in an amount of time, is obtained by multiplying the flow rate through the apparatus by the percentage deionization achieved. Since the two cells have the same overall size and shape of resin chamber, the feed flow rate can be considered as the flow rate through the apparatus.

(c) The performance factor is obtained by multiplying the design factor by the current efficiency and dividing by the voltage across the cell. It represents a true index of performance, since deionization percentage, flow rate, current efficiency and power consumption are all included.

It will be recognized that individual values obtained for efficiency factor, design factor, and particularly for performance factor which takes in a number of variables, will vary from one set of operating conditions to another due to difficulties in obtaining precise measurements and time required to reach true equilibrium conditions. At- Table I

PERFORMANCE OF "SEGMENTED BED CELL"

| Time (hours) | Feed p.p.m. | Feed flow ml./sec. | Effluent p.p.m. | Percent deionization | Volts | Current flow M.A. | Percent current eff. |
|---|---|---|---|---|---|---|---|
| 12.9 | 116 | 2.5 | 9 | 92.4 | 15 | 540 | 98.5 |
| 130.0 | 116 | 2.5 | 7 | 94.0 | 15 | 600 | 87.4 |
| 140.0 | 116 | 7.5 | 76 | 34.5 | 15 | 800 | 72.0 |
| 156.0 | 116 | 7.5 | 8 | 93.0 | 40 | 2,600 | 60.0 |
| 255.6 | 108 | 2.2 | 8 | 92.6 | 15 | 460 | 91.5 |
| 348.2 | 112 | 2.0 | 9 | 92.0 | 40 | 620 | 63.6 |
| 354.9 | 112 | 7.5 | 67 | 40.2 | 40 | 660 | 98.0 |
| 380.5 | 112 | 6.7 | 31 | 72.3 | 35 | 1,600 | 65.0 |
| 418.9 | 112 | 6.7 | 28 | 74.9 | 50 | 2,400 | 58.3 |
| 429.9 | 112 | 6.7 | 10 | 91.1 | 50 | 2,000 | 65.5 |
| 467.0 | 116 | 2.3 | 5 | 95.8 | 20 | 680 | 69.0 |
| 477.5 | 116 | 2.3 | 6 | 94.8 | 20 | 680 | 71.2 |
| 516.0 | 118 | 2.3 | 23 | 80.6 | 17 | 520 | 59.0 |
| 528.4 | 118 | 2.3 | 5 | 95.8 | 30 | 860 | 57.9 |
| 548.5 | 118 | 2.3 | 3 | 97.5 | 30 | 740 | 68.6 |
| 576.4 | 104 | 4.0 | 7 | 83.1 | 50 | 1,600 | 46.8 |
| 600.1 | 106 | 4.0 | 5 | 95.2 | 58 | 2,000 | 38.8 |
| 625.1 | 130 | 4.0 | 7 | 94.5 | 50 | 1,400 | 67.1 |
| 649.4 | 130 | 3.6 | 5 | 95.5 | 50 | 1,400 | 61.0 |
| 710.7 | 108 | 2.1 | 10 | 90.7 | 25 | 660 | 59.8 |
| 780.1 | 116 | 3.1 | 14 | 87.1 | 40 | 1,200 | 50.1 |

Table II

PERFORMANCE OF "MIXED BED CELL"

| Time (hours) | Feed p.p.m. | Feed flow ml./sec. | Effluent p.p.m. | Percent deionization | Volts | Current flow M.A. | Percent current eff. |
|---|---|---|---|---|---|---|---|
| 42.4 | 106 | 1.88 | 23 | 28.3 | 15 | 680 | 44.0 |
| 83.5 | 108 | 1.87 | 13 | 82.5 | 15 | 1,000 | 34.0 |
| 121.0 | 108 | 2.06 | 52 | 52 | 25 | 740 | 30.1 |
| 146.0 | 108 | 2.06 | 27 | 75 | 20 | 420 | 77.5 |
| 179.9 | 114 | 2.06 | 28 | 75.2 | 25 | 660 | 51.5 |
| 237.0 | 114 | 1.43 | 11 | 90.2 | 25 | 660 | 41.5 |
| 300.0 | 104 | 0.418 | 6 | 94.5 | 25 | 660 | 11.8 |
| 334.0 | 116 | 1.87 | 14 | 87.0 | 50 | 2,200 | 16.7 |
| 377.1 | 106 | 2.3 | 61 | 42.4 | 40 | 1,100 | 18.0 |

In the foregoing tables, "percent current efficiency" is determined by use of Faraday's Constant. Comparison of the data in the tabulations clearly shows that the "segmented bed cell" tention is directed, however, to the following tabulations of the evaluation factors thus derived from the data in Tables I and II:

Table III
EVALUATION FACTORS—SEGMENTED BED CELL

| Time (hours) | Efficiency factor, ×10⁻² | Design factor | Performance factor |
|---|---|---|---|
| 12.9 | 91.0 | 231 | 1,520 |
| 130.0 | 82.0 | 235 | 1,370 |
| 140.0 | 24.8 | 256 | 1,240 |
| 156.0 | 54.8 | 697 | 1,025 |
| 255.6 | 84.5 | 204 | 1,270 |
| 348.2 | 58.5 | 184 | 292 |
| 354.9 | 39.4 | 302 | 740 |
| 380.5 | 47.0 | 485 | 898 |
| 418.9 | 43.5 | 502 | 145 |
| 429.9 | 59.6 | 610 | 795 |
| 467.0 | 66.0 | 220 | 751 |
| 477.5 | 67.5 | 215 | 356 |
| 516.0 | 47.5 | 185 | 650 |
| 528.4 | 55.5 | 220 | 423 |
| 548.5 | 67.0 | 224 | 510 |
| 576.4 | 39.0 | 332 | 510 |
| 600.1 | 36.8 | 381 | 316 |
| 625.1 | 63.5 | 378 | 890 |
| 649.4 | 58.3 | 344 | 420 |
| 710.7 | 54.3 | 191 | 680 |
| 780.1 | 43.5 | 270 | 337 |
| Average | 56.4 | 317 | 768 |

Table IV
EVALUATION FACTORS—MIXED BED CELL

| Time (hours) | Efficiency factor, ×10⁻² | Design factor | Performance factor |
|---|---|---|---|
| 42.4 | 34.4 | 147 | 430 |
| 83.5 | 29.6 | 163 | 368 |
| 121.0 | 15.6 | 107 | 40 |
| 146.0 | 58.0 | 154 | 750 |
| 179.9 | 38.6 | 155 | 316 |
| 237.0 | 37.4 | 129 | 212 |
| 300.0 | 11.1 | 40 | 40 |
| 334.0 | 14.6 | 163 | 27 |
| 377.1 | 7.1 | 97 | 16 |
| Average | 27.4 | 128 | 244 |

Particularly significant in the foregoing tabulations are the average values, which show the advantages of the "Segmented Bed Cell" over the "Mixed Bed Cell" to be about 2x in terms of efficiency factor, 2.5x in terms of design factor, and more than 3x in terms of performance factor.

While the reasons for the surprisingly better performance of the "Segmented Bed Cell" are not entirely understood, it would appear to be due largely to the fact that each membrane is contacted by one type of resin, and none of the opposite type, coupled with the fact that the segmented, wedge-shaped resin chambers provide uninterrupted and continuously enlarging paths or ionic bridges for transport of sorbed ions.

Various changes and modifications in the improved deionization apparatus as herein disclosed will occur to those skilled in the art, and to the extent that such changes and modifications are embraced by the appended claims, it is to be understood that they constitute part of our invention.

We claim:

1. An electrodialysis apparatus for deionization of ionic fluid, comprising: means defining a treating chamber and a pair of electrode chambers, one on each side of said treating chamber, said means including a pair of ion-permeable membranes separating said treating chamber from said electrode chambers; an anode positioned in one of said electrode chambers and a cathode positioned in the other of said electrode chambers; fluid-permeable partition means dividing said treating chamber into a plurality of interfitting sections with each section being in contact with only one of said ion-permeable membranes, adjacent sections being in contact with a different one of said ion-permeable membranes and extending toward but terminating short of a respective opposed ion-permeable membrane, particulate cation and anion exchange materials in said sections arranged so that cation exchange material is in alternate sections with respect to said anion exchange material with the anion exchange material being in contact with the ion-permeable membrane on the anode side and with the cation exchange material being in contact with the ion-permeable membrane on the cathode side, and means for flowing said ionic liquid between said ion-permeable membranes, and serially through said adjacent sections containing said ion-exchange material.

2. The apparatus of claim 1 wherein means are provided for packing said sections with ion-exchange particles.

3. An electrodialysis apparatus for deionization of ionic fluid, comprising: means defining a treating chamber and a pair of electrode chambers, one on each side of said treating chamber, said means including a pair of ion-permeable membranes separating said treating chamber from said electrode chambers; an anode positioned in one of said electrode chambers and a cathode positioned in the other of said electrode chambers; fluid-permeable permanent partition means dividing said treating chamber into a plurality of interfitting sections with each section being in contact with only one of said ion-permeable membranes, adjacent sections being in contact with a different one of said ion-permeable membranes and extending toward but terminating short of a respective opposed ion-permeable membrane, anion exchange resin beads tightly packed within the sections in contact with the permeable membrane on the anode side of the treating chamber to form a liquid-permeable, substantially stable bed, cation exchange resin beads tightly packed within the sections in contact with the permeable membrane on the cathode side of the treating chamber to form a liquid-permeable, substantially stable bed, and means for flowing said ionic liquid between said ion-permeable membrane and serially through said sections containing alternate beds of anion and cation exchange resin beds.

4. The apparatus of claim 3 wherein the ion-permeable membrane on the anode side of the treating chamber is anion permselective and wherein the ion-permeable membrane on the cathode side of the treating chamber is cation permselective.

5. The apparatus of claim 3 wherein said electrode compartments are filled with fluid-permeable material and means are provided for flowing electrolyte through said electrode compartments.

6. The apparatus of claim 3 wherein means are provided for adjusting the packing pressure on the ion exchange resin beads in said sections.

7. In a three compartment electrodialysis cell for deionizing an ionic liquid comprising a middle compartment separated from an anode compartment by an anion permselective membrane and from a cathode compartment by a cation permselective membrane: fluid-permeable partition means dividing said middle compartment into a plurality of interfiitting sections of essentially triangular cross-sectional contour with the base portions of alternate sections contacting the anion permselective membrane and the cation permselective membrane respectively, anion exchange resin beads tightly packed in the sections contacting the anion permselective membrane, cation exchange resin beads tightly packed in the sections contacting the cation permselective membranes, and means for flowing said ionic liquid through said middle compartment between said membranes and serially through said resin containing sections.

8. In an electrodialysis apparatus for the deionization of ionic fluids having a fluid treatment chamber between electrode chambers, the improvement wherein the fluid treatment chamber comprises a frame part defining end and side walls of said chamber, means secured to said frame supporting ion-permeable membranes over the opposed open faces of said frame to enclose said fluid treatment chamber, opposed ends of said frame having inlet and outlet means for circulating fluid through said chamber, fluid permeable permanent partition means traversing said frame between opposed side walls thereof dividing said liquid treatment chamber into two groups of interfitting resin compartments of essentially triangular cross-sectional contour, and the resin compartments of each group having the base portions thereof falling along one of said ion-permeable membranes and the apex portions thereof extending toward, but terminating short of, the opposed ion-permeable membrane.

9. The electrodialysis apparatus as defined in claim 8, wherein opposed sides of said frame part are provided with a plurality of opposed closable ports, and each pair of opposed ports being in alignment with a single resin compartment permitting individual insertion, removal and cleaning of resin for said compartment.

10. The electrodialysis apparatus as defined in claim 9, wherein said ports are further fashioned to detachably engage screened plug means and external compartment means facilitating the hydraulic filling, emptying and cleaning of resin in individual resin compartments.

11. The electrodialysis apparatus as defined in claim 8, wherein the fluid permeable means dividing said fluid treatment chamber comprises a first group of rod-like guides uniformly spaced adjacent one of said membranes, a second group of rod-like guides similarly spaced adjacent the other of said membranes in uniformly staggered relation to said first group, and a sheet of fluid permeable permanent partition material laced in zigzag fashion around said guides to form walls separating said interfitting resin compartments.

12. The electrodialysis apparatus as defined in claim 8, wherein the means supporting said ion-permeable membranes includes woven plastic material backing said membranes.

13. The electrodialysis apparatus as defined in claim 8, wherein the means supporting said ion-permeable membranes comprise plastic screen members in the electrode chambers providing backing for said membranes and fluid-permeable fillers for said chambers.

14. The electrodialysis apparatus as defined in claim 13, wherein the plastic screen members comprise plastic screen members of fine mesh adjacent the membranes and plastic screen members of coarser mesh having electrode means embedded therein.

15. An electrodialysis apparatus comprising a treatment chamber for ionic fluid bounded by electrolyte compartments, a frame part defining the treatment chamber and having fluid inlet and outlet means at opposed ends thereof and ion-permeable membranes over opposed surfaces thereof separating said chamber from said electrolyte compartments, means for imparting a direct current electrical potential across said chamber between said electrolyte compartments including an anode on one side of the treatment chamber and a cathode on the other side of the treatment chamber, fluid permeable spacer and support means substantially filling said electrolyte compartments, partition means in said fluid treatment chamber extending transversely of the direction of fluid flow therethrough dividing said chamber into two groups of interfitting resin compartments of essentially triangular cross-sectional contour, the resin compartments of each group having the base portions thereof extending along one of said ion-permeable membranes and the apex portions thereof approaching but terminating short of, the opposed membrane, particulate anion exchange resin in the resin compartments having base portions extending along the membrane on the anode side and particulate cation exchange resin in the resin compartments having base portions extending along the membrane on the cathode side.

16. An electrodialysis apparatus as defined in claim 8, wherein the electrode chambers include coarse plastic screen members supporting anode and cathode means respectively, and means for circulating rinse water through the anode compartment, then through the cathode compartment, and then to waste.

17. The apparatus of claim 15 wherein the ion-exchange resins are in the form of resin beads tightly packed within the respective resin compartments.

18. Apparatus for treating an ionic liquid comprising a treating compartment between anode and cathode compartments, said treating compartment being defined by opposed ion-permeable walls separating the treating compartment from the anode and cathode compartments, respectively, a plurality of interfitting, triangular shaped beds of ion exchange resin beads disposed in said treating chamber with alternate ion exchange resin beds being of anion and cation resin beads, respectively, the beds containing anion exchange resin beads being in contact along their base portions with the ion-permeable wall of the treating chamber toward the anode compartment and having substantially no contact with the ion-permeable wall of the treating chamber toward the cathode compartment, and with the beds containing cation exchange resin beads being in contact along their base portions with the ion-permeable wall of the treating chamber toward the cathode compartment and having substantially no contact with the ion-permeable wall of the treating chamber toward the anode compartment, and means for flowing said ionic liquid through said treating chamber between said ion-permeable walls and serially through said ion exchange resin containing beds.

References Cited by the Examiner

UNITED STATES PATENTS

| 2,739,938 | 3/1956 | Weichers | 204—301 |
| 2,762,254 | 9/1956 | Kegeles | 204—299 |
| 2,763,607 | 9/1956 | Staverman | 204—131 |
| 2,828,257 | 3/1958 | Briggs | 204—263 |
| 2,912,372 | 11/1959 | Stoddard | 204—151 |
| 3,014,855 | 12/1961 | Kressman | 204—151 |

JOHN H. MACK, *Primary Examiner.*

JOSEPH REBOLD, WINSTON A. DOUGLAS,
*Examiners.*

T. TUNG, *Assistant Examiner.*